US011100358B2

(12) United States Patent
Andilla et al.

(10) Patent No.: US 11,100,358 B2
(45) Date of Patent: Aug. 24, 2021

(54) METHOD, ARTIFICIAL NEURAL NETWORK, DEVICE, COMPUTER PROGRAM AND MACHINE-READABLE MEMORY MEDIUM FOR THE SEMANTIC SEGMENTATION OF IMAGE DATA

(71) Applicant: Robert Bosch GmbH, Stuttgart (DE)

(72) Inventors: Ferran Diego Andilla, Barcelona (ES); Dimitrios Bariamis, Hildesheim (DE); Masato Takami, Hildesheim (DE); Uwe Brosch, Hohenhameln (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 16/591,151

(22) Filed: Oct. 2, 2019

(65) Prior Publication Data

US 2020/0110961 A1 Apr. 9, 2020

(30) Foreign Application Priority Data

Oct. 5, 2018 (DE) .......................... 102018217090.8

(51) Int. Cl.
*G06K 9/46* (2006.01)
*G06K 9/62* (2006.01)
*G06N 3/08* (2006.01)

(52) U.S. Cl.
CPC ......... *G06K 9/4638* (2013.01); *G06K 9/4633* (2013.01); *G06K 9/6286* (2013.01); *G06N 3/08* (2013.01)

(58) Field of Classification Search
None
See application file for complete search history.

(56) References Cited

U.S. PATENT DOCUMENTS

2020/0257930 A1* 8/2020 Nahr ...................... G06N 3/063
2020/0320748 A1* 10/2020 Levinshtein ....... G06K 9/00248

OTHER PUBLICATIONS

Quan, et al.: "FusionNet: A deep fully residual convolution neural network for image segmentation in connectomics", https://arXiv.org/abs/1616.053, (2016), pp. 1-10.
Shelhamer et al., "Fully Convolutional Networks for Semantic Segmentation," arXiv:1605.06211 (2016).
Olaf Ronneberger, Philipp Fischer, Thomas Brox. U-Net: Convolutional Networks for Biomedical Image Segmentation. Medical Image Computing and Computer-Assisted Intervention (MICCAI), Springer, LNCS, vol. 9351.

* cited by examiner

*Primary Examiner* — Fayyaz Alam
(74) *Attorney, Agent, or Firm* — Norton Rose Fulbright US LLP; Gerard Messina

(57) ABSTRACT

A method for the calculation resource-saving semantic segmentation of image data of an imaging sensor with an artificial neural network, in particular, of a convolutional neural network, the artificial neural network including an encoder path, a decoder path (and a skip component), including: initial connection (merge) of an input tensor to a skip tensor with an initial connection (merge) function/connection instruction to obtain a merged tensor, the input tensor and the skip tensor being dependent on the image data; application of a function of a neural network, in particular, of a convolution to the merged tensor to obtain a proof reader tensor; second connection (merge) of the proof reader tensor to the input tensor with a second connection (merge) function/connection instruction to obtain an output tensor; outputting the output tensor to the decoder path of the artificial neural network.

12 Claims, 9 Drawing Sheets

METHOD, ARTIFICIAL NEURAL NETWORK, DEVICE, COMPUTER PROGRAM AND MACHINE-READABLE MEMORY MEDIUM FOR THE SEMANTIC SEGMENTATION OF IMAGE DATA

FIELD OF THE INVENTION

The present invention relates to a method for the semantic segmentation of image data. The present invention also relates to a related artificial neural network, a device, a computer program, and a machine-readable memory medium (computer readable medium).

BACKGROUND INFORMATION

"Evan Shelhamer, Jonathan Long, Trevor Darrell. Fully Convolutional Models for Semantic Segmentation. PAMI 2016." describes an advancement of convolutional neural networks. Convolutional neural networks are strong artificial neural networks for processing visual data, which are able to create a semantic feature hierarchy of the visual data. The publication describes the approach of using a "Fully Convolutional Network", which is able to receive input data of an arbitrary amount and to output an output corresponding in size with efficient derivation of the features.

"Olaf Ronneberger, Philipp Fischer, Thomas Brox. U-Net: Convolutional Networks for Biomedical Image Segmentation. Medical Image and Computer-Assisted Intervention (MICCAI), Springer, LNCS, Vol. 9351" describes an architecture of an artificial neural network and a training strategy for this network, which is based on the utilization of expanded (augmented) training data in order to utilize the existing annotated examples more efficiently. The architecture of the network includes a "contracting path" (encoder path) for detecting the context of the input data and symmetrically thereto an "expanding path" (decoder path), which enables a precise location of the detected context. This artificial neural network may be trained using a comparably small number of training data.

SUMMARY OF THE INVENTION

Artificial neural networks, in particular, so-called convolutional neural networks (CNN), for semantically segmenting image data, in particular for localizing and classifying objects in image data, include a high demand for calculation resources. As a result of the addition of a decoder component or upsampling component and a connection component (skip component), via which the image data are restored to their original resolution after the semantic analysis in the encoder component, the demand for calculation resources continues to drastically increase. In some implementations, this may result in an exponential increase in the demand for calculation resources.

In addition to the increase in the demand for calculation resources, a semantic segmentation of image data on a pixel basis requires more memory resources when using artificial neural networks, in particular, when using CNN, i.e., more memory bandwidth, memory accesses and memory space during the training phase and during the use of the network.

The disadvantage of this additional demand for calculation resources and memory resources increases as soon as the application does not take place on memory-intensive and spread-calculating special processing units, such as graphical processing unit clusters (GPU clusters), but is to run on embedded processing units, such as embedded hardware or the like.

It is against this background that the present invention puts forth a method, an artificial neural network, a device, a computer program and a machine-readable memory medium for semantically segmenting image data of an imaging sensor.

Image data in the present case may be understood to mean data of an imaging sensor. These are primarily understood to mean the data of a video sensor, thus of a camera. Due to the similarity of the data, it is equally possible to process data of a radar sensor, an ultrasonic sensor, a LIDAR sensor or the like as image data with the aid of the present invention. With regard to the present invention, therefore, radar sensors, ultrasonic sensors, LIDAR sensors or the like may be understood to mean imaging sensors.

Of particular importance for this invention are image data of an imaging sensor suitable for use in a vehicle or the like, thus, an automotive image sensor.

Semantic segmentation is understood in the present case to mean the processing of image data, with the aim of ascertaining the semantic classes of the objects contained in the image as well as their location in the image. In this case, it should be noted that pieces of global information in the image permit conclusions to be drawn about the semantic class of the objects, whereas local information in the image permits conclusions to be drawn about the localization of the objects in the image.

One aspect of the present invention is a method for semantically segmenting image data with the aid of an artificial neural network, in particular, of a convolutional neural network (CNN). The artificial neural network includes an encoder path for ascertaining the semantic classes in the image data and a decoder path for localizing the ascertained classes in the image data. The method includes the steps:

Initial connection or merge of an input tensor to or with a skip tensor with the aid of a first connection function in order to obtain a merged tensor.

The input tensor and the skip tensor in the present case may be a function of the image data.

Application of a function of a neural network, in particular, of a convolution to the merged tensor in order to obtain a proof reader tensor.

Second connection or merge of the proof reader tensor to or with the input tensor with the aid of a second connection function in order to obtain an output tensor.

Outputting the output tensor to the decoder path of the artificial neural network.

An artificial neural network is understood in the present case to mean a network made up of artificial neurons for processing information, for example, for processing image data, in particular, for localizing and classifying objects in image data.

A convolutional neural network (CNN) is understood in the present case to mean a class of artificial neural networks considered to be "state of the art" in the field of classification. The basic structure of a CNN is made up of an arbitrary sequence of convolutional layers and pooling layers, which are enclosed by one or by multiple fully-connected layer(s). Each of the layers is constructed of artificial neurons.

An encoder path is understood in the present case to mean a path of processing of the image data up to the classification of objects in the image data.

A decoder path is understood in the present case to mean a path, which follows the encoder path and, based on the classification, restores the original image data for localizing the classified objects.

A tensor is understood in the present case to mean a data representation during the processing in an artificial neural network. The data set includes a processed version of the image data and associated feature maps. A tensor at level 1 of the i-st step in an artificial neural network is typically represented as $x_i^l \in R^{n \times m \times f}$ having n rows, m columns and f feature maps.

An input tensor is a data representation prior to the processing by the method of the present invention. According to the present invention, the input tensor is based on the upward converted output tensor of a previous level l−1 of the artificial neural network. The upward conversion in this case takes place to the extent that the dimension of the upward converted tensor corresponds to the dimensions of the skip tensor in the step of the initial connection.

A skip tensor is a data representation on the level l of the j-st step in the neural network. The skip tensor may be provided by a connection component (skip component) and thus provides pieces of information from level l of the artificial neural network from the encoder path directly, i.e., without further processing in the encoder path, to the decoder path of the artificial neural network.

A connection component is understood in the present case to mean an architecture component in a semantically segmenting artificial neural network, which provides the pieces of information from the encoder path to the corresponding location of the decoder path. Connection components may also appear as skip connections or as skip modules.

A merged tensor is a data representation following the step of the initial connection according to the method of the present invention. The merged tensor is the result of a first connection function. Connection functions may be seen to be the functions concatenation, addition, multiplication and the like.

A proof reader tensor is a data representation following the step of applying a function of an artificial neural network, in particular, of a convolutional neural network (CNN), according to the method of the present invention. A function of an artificial neural network, in particular, of a CNN, may be seen to be the functions convolution—also in the form of a convolutional block—i.e., a multiple application of convolutions, depth-wise convolution, squeeze, residual value (residual), density (dense), inception, activation (activation, act), normalization, pooling or the like.

Inception is understood in the present case to mean an architecture variation of an artificial neural network, in particular, of a convolutional neural network, as it was first described in Szedgedy et al. Going deeper with convolutions. In Proceedings of the IEEE Conference on Computer Vision and Pattern Recognition, pp. 1-9, 2015.

An output tensor is a data representation following the step of the second connection according to the method of the present invention for further processing on the decoder path of the artificial neural network. The output tensor is the result of a second connection function. Connection functions may be seen to be the functions concatenation, addition, multiplication and the like.

A feature map is understood in the present case to mean the output of a layer of an artificial neural network. In a CNN, this is typically the result of the processing by a convolutional layer, followed by the associated pooling layer and may be used as input data for the following layer or—if provided—for the fully connected layer.

A function of an artificial neural network may be understood in the present case to be an arbitrary function of a neural layer of an artificial neural network. This may be convolution—also in the form of a convolutional block—i.e., a multiple application of convolutions, depth-wise convolution, squeeze, residual value (residual), density (dense), inception, activation (activation, act), normalization, pooling or the like.

Inception is understood in the present case to mean an architecture variation of an artificial neural network, in particular, of a convolutional neural network, as it was first described in Szedgedy et al. Going deeper with convolutions. In Proceedings of the IEEE Conference on Computer Vision and Pattern Recognition, pp. 1-9, 2015.

The advantage of the method of the present invention is in the steps of applying a function of an artificial neural network in order to obtain a proof reader tensor and in the subsequent step of connecting the proof reader tensor to the input tensor. In the step of applying, both coarse-granular features from the encoder path as well as fine-granular features from the decoder path are connected to one another. In the step of connecting, the input tensor is refined with the aid of the proof reader tensor in order to generate an output tensor for the next layer.

According to one specific embodiment of the method of the present invention, the function of an artificial neural network in the step of applying is a function of the feature map or of the feature maps of the input tensor. This means, the functions are selected in such a way that they match the feature map or the feature maps of the input tensors, even though the function is applied to the merged sensor.

This specific embodiment of the method has the advantage that as a result, the classification that has taken place in the deeper layers of the artificial neural network is refined, i.e., takes place more precisely.

According to one specific embodiment of the method according to the invention, the initial connection function and the second connection function are configured in such a way that the dimension of the input tensor is maintained.

According to one specific embodiment of the method of the present invention, the steps of the method take place in the decoder path of the artificial neural network.

Another aspect of the present invention is an artificial neural network for localizing and classifying image data, the artificial neural network including an encoder path for classifying the image data, a decoder path for localizing the image data, and being configured to carry out steps of the method according to the present invention.

An artificial neural network configured in this way may be used in a technical system, in particular, in a robot, in a vehicle, in a tool or in a factory machine, in order to determine output variables as a function of input variables. Input variables of the artificial neural network may be sensor data or variables that are a function of sensor data. The sensor data may originate from sensors of the technical system or may be received by the technical systems from the outside. At least one actuator of the technical system is activated with an activation signal by a control unit of the technical system as a function of the output variables of the artificial neural network. Thus, for example, a movement of a robot or of a vehicle may be controlled or a tool or a factory machine may be activated.

In one specific embodiment of the artificial neural network according to the present invention, the artificial neural network may be configured as a convolutional neural network.

Another aspect of the present invention is a device, which is configured to carry out steps of the method according to the present invention.

Another aspect of the present invention is a computer program, which is configured to carry out steps of the method according to the present invention.

Another aspect of the present invention is a machine-readable memory medium, on which the artificial neural network according to the present invention or the computer program according to the present invention is stored.

Details and specific embodiments of the present invention are explained in greater detail below with reference to multiple figures.

DETAILED DESCRIPTION

Figure 1:
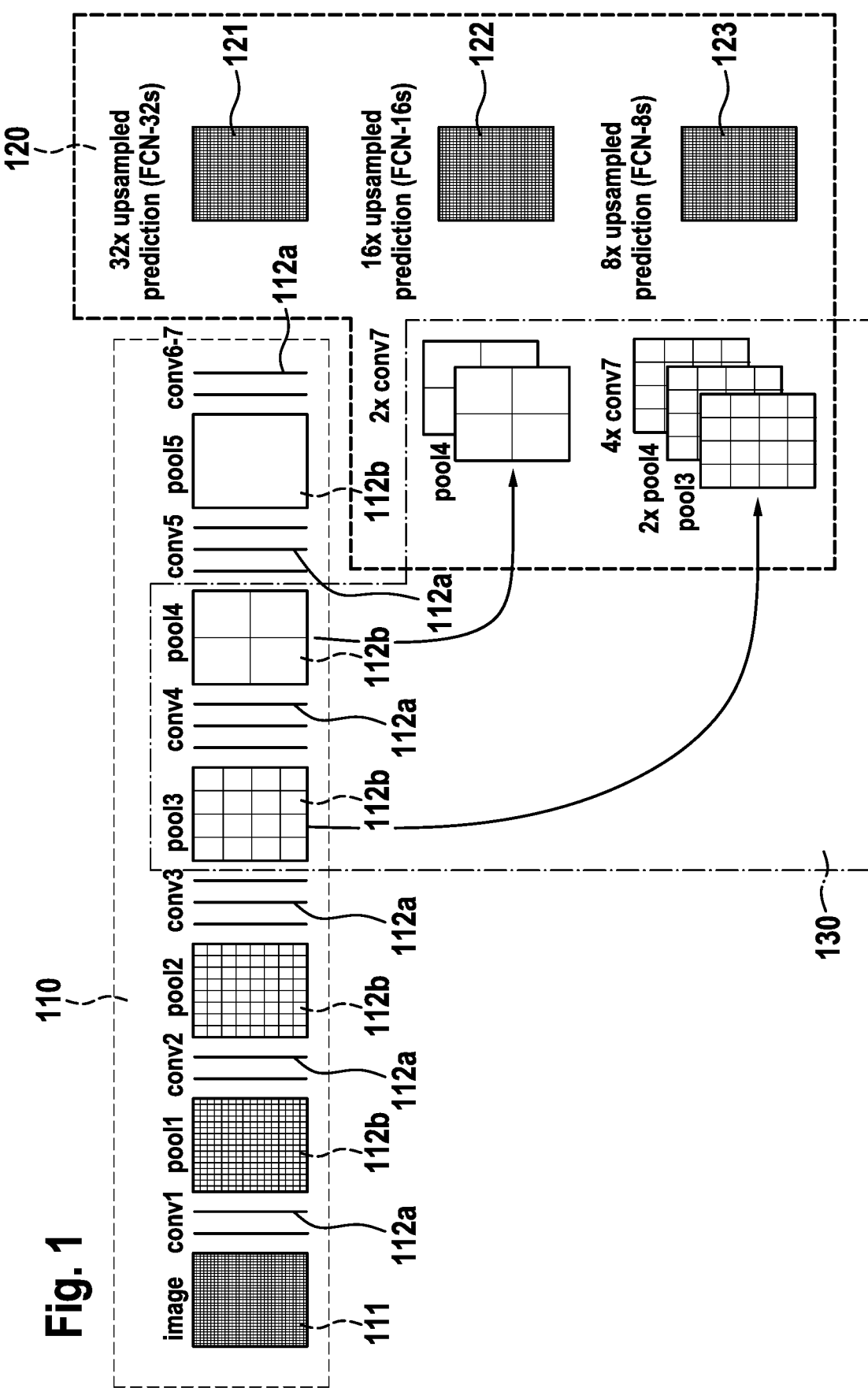
FIG. 1 shows a block diagram of a fully convolutional network from the related art.

FIG. 1 shows a block diagram of a fully convolutional network from "Evan Shelhamer, Jonathan Long, Trevor Darrel. Fully Convolutional Models for Semantic Segmentation. PAMI 2016."

The figure combines parts of the depicted sequence in an artificial neural network into blocks.

In block encoder 110, the processing steps are depicted starting from image data as input data 111 across multiple layers of a convolutional neural network (CNN). Convolutional layer 112a and pooling layers 112b are clearly apparent in the figure.

"Deconvolutioned" results 121, 122, 123 of the CNN are depicted in block decode 120. Deconvolution in this case may be achieved by reversing the convolution steps. In the process, it is possible to map the coarse-granular classification results onto the original image data in order to obtain in this way a localization of the classified objects.

Connections of intermediate classification results of a higher level of the CNN to the "deconvolutioned" results are depicted in block skip module 130. Thus, in row 2, the intermediate results of the fourth pool have been linked to end results 122 and the intermediate results of the third and the fourth pool have been linked to end results 123.

The advantage of these linkages is the possibility of determining finer details and at the same time to receive a piece of semantic information of a higher level in return.

Figure 2:
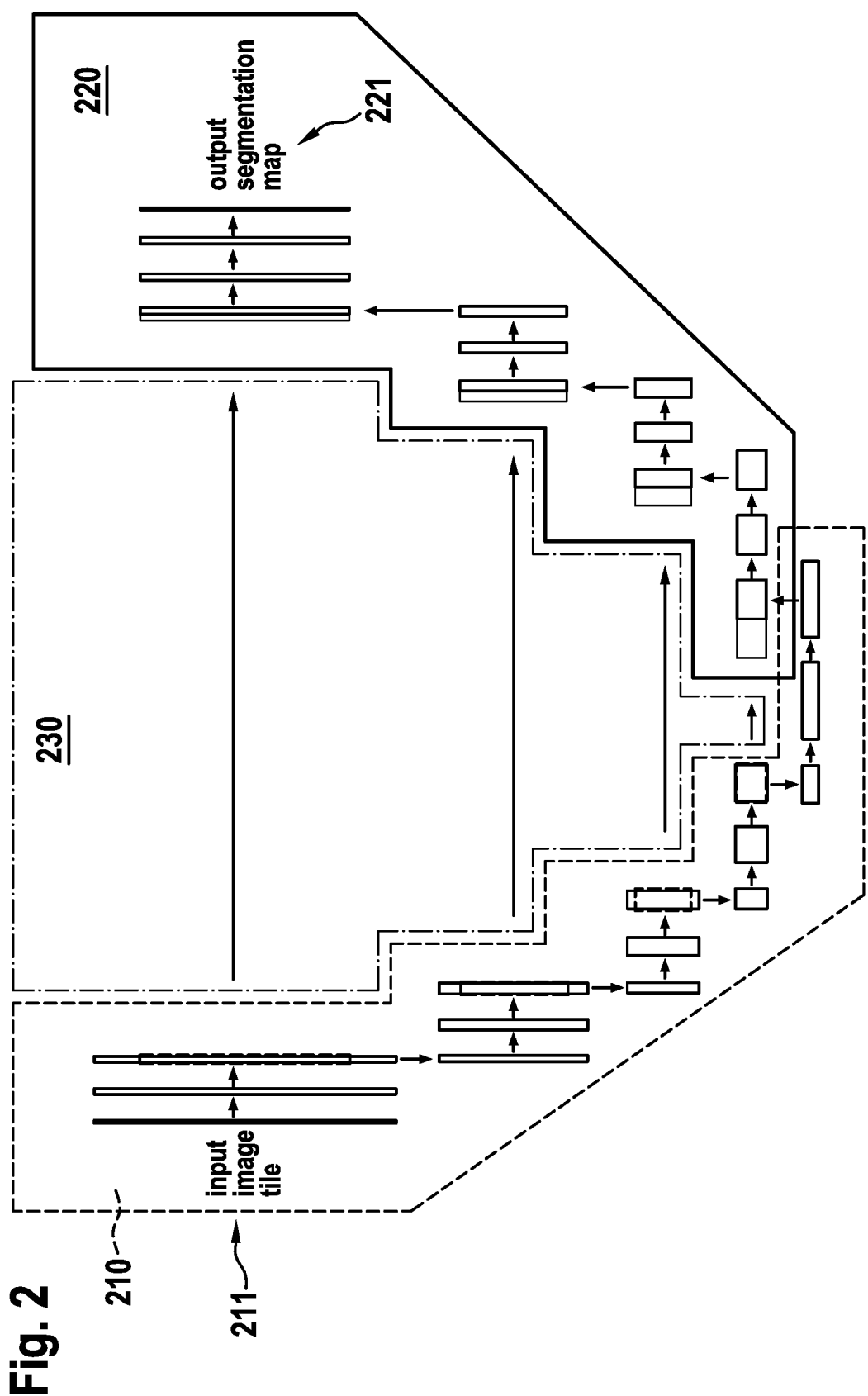
FIG. 2 shows a block diagram of the U-net architecture of a convolutional network from the related art.

FIG. 2 shows a block diagram of the U-net architecture of a convolutional network from "Olaf Ronneberger, Philipp Fischer, Thomas Brox. U-Net: Convolutional Networks for Biomedical Image Segmentation. Medical Image Computing and Computer-Assisted Intervention (MICCAI), Springer, LNCS, Vol. 9351".

The processing steps starting from image data as input data 211 across multiple layers of a convolutional neural network (CNN) for classifying input data 211 are depicted in block encoder 210.

The "upconvolution steps (upconvolution)", starting from the deepest classification level via a corresponding number of deconvolutional layers up to a semantically segmented map 221 having localized and classified objects of input data 211 are depicted in block decode 220.

Connections (skip connections) between the classification layers and the corresponding localization layers are depicted in block 230. These connections represent the information flow in the artificial neural network between the classification task and the localization task. As a result, it is possible to correlate coarse-granular semantic segmentation with a higher degree of restoration of the input data.

Figure 3:
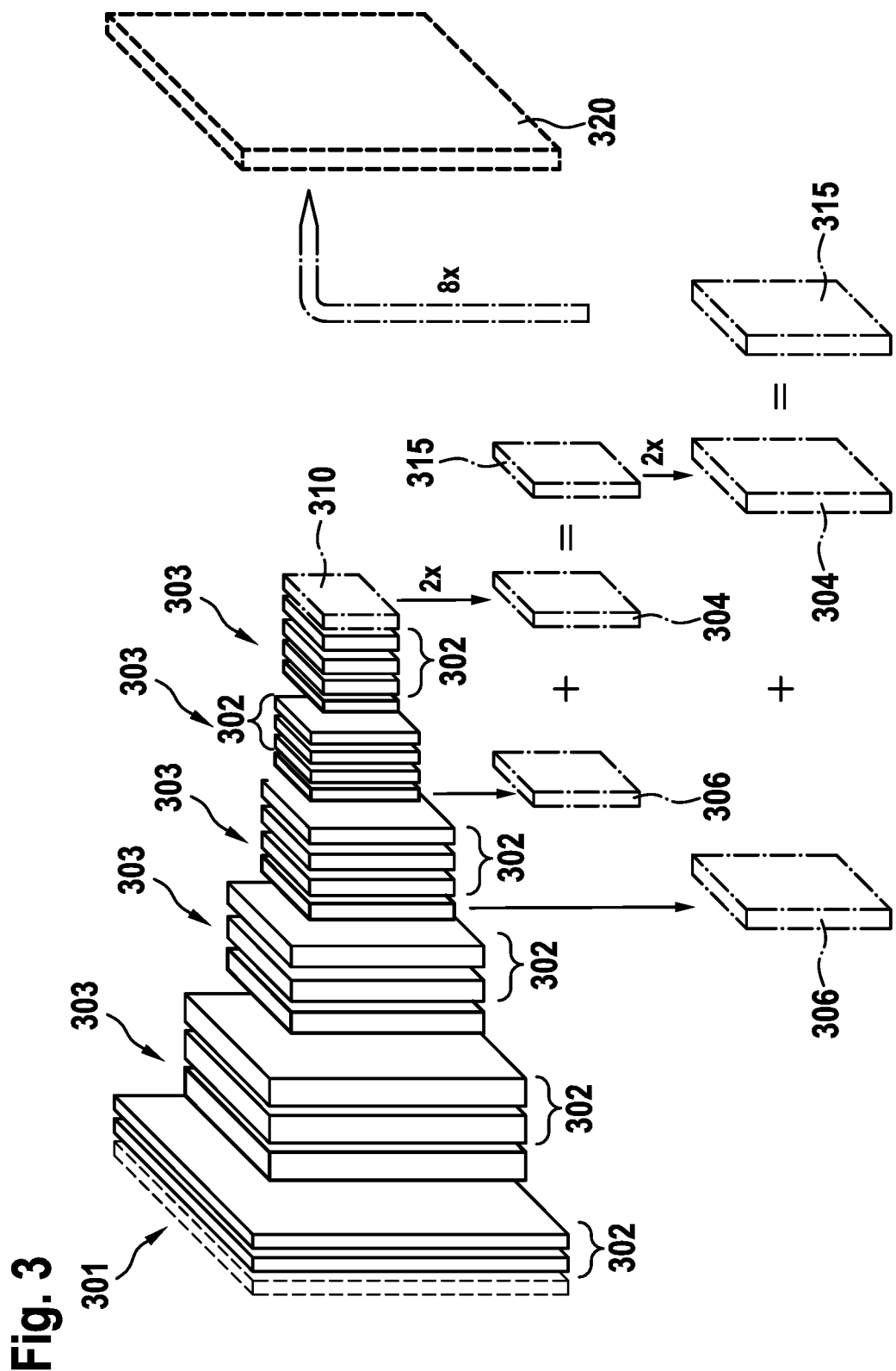
FIG. 3 shows an illustration of an artificial neural network according to the FCN architecture.

FIG. 3 shows the illustration of an artificial neural network in the form of a "fully convolutional network" (FCN) based on tensors. In this case, image data are fed to the network as input tensor 301. As a result of convolution functions, so-called convolutions, feature maps 302 are generated based on input tensor 301. The pieces of information ascertained in the feature maps by the convolution functions are compressed via so-called pooling and mapped onto an encoder tensor 303. Encoder tensor 303 serves as an input tensor for the next deeper level of the FCN. At this point, convolution functions, so-called convolutions, are again applied in order to obtain pieces of semantically richer information, which are mapped in corresponding feature maps 302. Result tensor 310 of the encoder block of the FCN serves as an input tensor for the decoder block of the FCN, in which the pieces of semantically rich information are augmented with pieces of localization information of the higher layers of the FCN.

For this purpose, result tensor 310 is initially converted up (upsampling) to an upsampling tensor 304 and connected to a skip tensor 306, which has been derived, for example, from an encoder tensor 303 of a higher layer. Instead of one encoder tensor 303, it would also be conceivable to supply one or multiple feature map tensor(s) 302 from the encoder block of the FCN to the decoder block of the FCN with the aid of the skip module.

The result of this operation is a decoder tensor 315, which converted up (upsampling), serves as upsampling tensor 304 for the next highest layer of the decoder block of the FNC.

At the end of the decoder block, decoder tensor 315 may be converted up to the original size of input tensor 301.

The result is semantically segmented image data 320 having classes and pieces of location information about the objects or features contained in the image data.

Since no transfer of semantic information takes place in FCN between the deeper and the finer representations (i.e. on the deeper layers of the network), the finer representations are less distinctive. As a result, these layers contribute more greatly to determination errors.

Furthermore, deeper layers are less susceptible to so-called "gradient vanishing". The less far removed the layers of input tensor 301 are, the greater the effect the "gradient vanishing" has on these layers.

"Gradient vanishing" is understood as the effect, which may occur when training artificial neural networks, that a change of the parameters may be vanishingly minimal. In the worst case, this effect results in a stagnation of the change or of the improvement of the trained parameters.

The introduction of skip modules 130 or skip connections 230 aids in combating this effect.

For these reasons, among others, FCN is suited primarily for a large number of semantic classes (i.e., for more than 3 classes) and rather for flat networks, since the semantic features of the finer layers are no longer distinctive.

Figure 4:
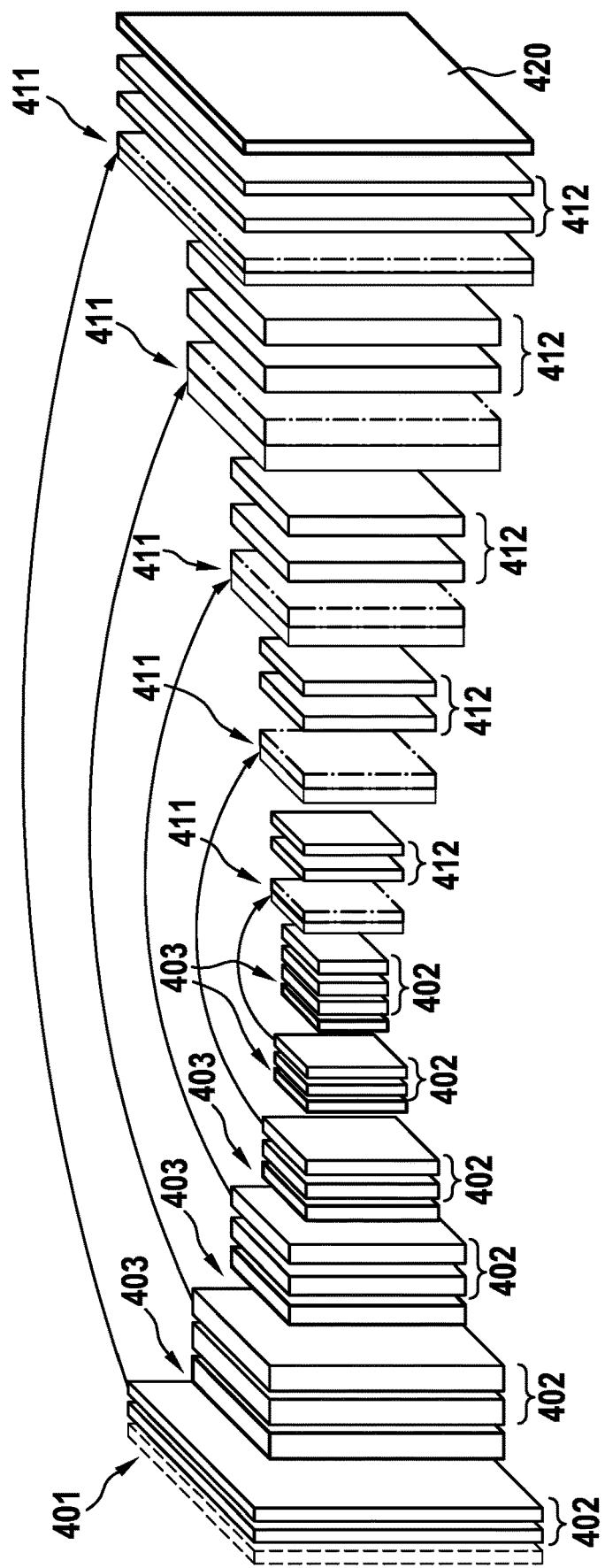
FIG. 4 shows an illustration of an artificial neural network according to the "U-net" architecture.

FIG. 4 shows an illustration of an artificial neural network according to the "U-net" architecture.

According to the illustration, image data are processed from left to right. The image data to be processed are fed to the artificial neural network as input tensor 401. Input tensor 401 represents the image data to be processed. Feature maps 402 are generated from input tensor 401 and further processed as tensors in the network by applying functions of a neural network, for example, convolution—also in the form of a convolutional block—i.e., of a multiple application of convolutions, depth-wise convolution, squeeze, residual value (residual), density (dense), inception, activation (activation, act), normalization, pooling or the like.

Artificial neural networks are typically constructed in layers. Functions of artificial neural networks, which do not result in a change in the resolution of the tensors, are typically applied within a layer.

In the event of a layer change, functions of artificial neural networks are typically applied, as a consequence of which the resolution of the tensors is changed. The resolution is reduced in the direction of deeper lying layers (pooling, downsampling), converted up (upsampling) in the direction of higher layers.

For downsampling, a so-called pooling function may be applied to the tensors. A pooling tensor 403 as input tensor for the deeper layer is present in the artificial neural network as the result of the pooling function. Functions of an artificial neural network may be applied to pooling tensor 403, as depicted in the illustration of FIG. 4, in order to obtain feature maps 402 based on pooling tensor 403.

In a U-net architecture, the deepest layer is reached when image data have been processed to the point that the (sought after or desired) pieces of class information are available. The information about the presence of particular semantic classes in image data typically lacks the information about the localization of the detected semantic classes. This means, the information about where the detected classes are in the image data.

For this purpose, the U-network provides a decoder path, in which the tensors (pooling tensor 403 and feature maps 402) are converted up (upsampling). The conversion up may take place up to the output resolution of the image data, depending on the application.

The conversion up from the deepest layers of the artificial neural network takes place by adding pieces of information from the corresponding levels of encoder path 210. This is depicted in the illustration of FIG. 4 by the connecting arrows between the respective layer of encoder path 210 to the corresponding layer of decoder path 220.

The addition takes place by stringing the tensors converted up by one layer in decoder path 220 together with the skip tensor from the encoder path to a concatenated tensor 411 in decoder path 220.

Functions of an artificial neural network such as, for example, convolution—also in the form of a convolutional block—i.e., of a multiple application of convolutions, depth-wise convolution, squeeze, residual value (residual), density (dense), inception, activation (activation, act), normalization, pooling or the like may be applied to concatenated tensor 411 in order to obtain feature maps 412 in decoder path 220.

The result of decoder path 220 is a result tensor 420, in which the representation of the processed image data, in which, in addition to the image data, the detected semantic classes, as well as their localization in the image data, are depicted.

This U-net architecture permits accurate localizations up to the original resolution of the image data by stringing together (concatenation) the features of encoder path 210 and subsequently connecting (merge) to knowledge about deeper and finer levels of the network.

This architecture is aimed at addressing the disadvantages of the FCN architecture by using more resources.

This use of resources in this case may result in increased costs. The increase in costs may be countered by keeping the number of output classes, i.e., the set of objects in the image data to be discriminated, low, for example, on the order of two to three classes.

The greatest disadvantage of the U-net architecture is the strong effect of the "gradient vanishing" in the deeper layers of the network. The effect results from the many layers that are situated between the "loss function" and the discriminative layers.

U-network architectures are therefore particularly suited for tasks that require only a small number of classes and in return a high localization accuracy.

Figure 5:
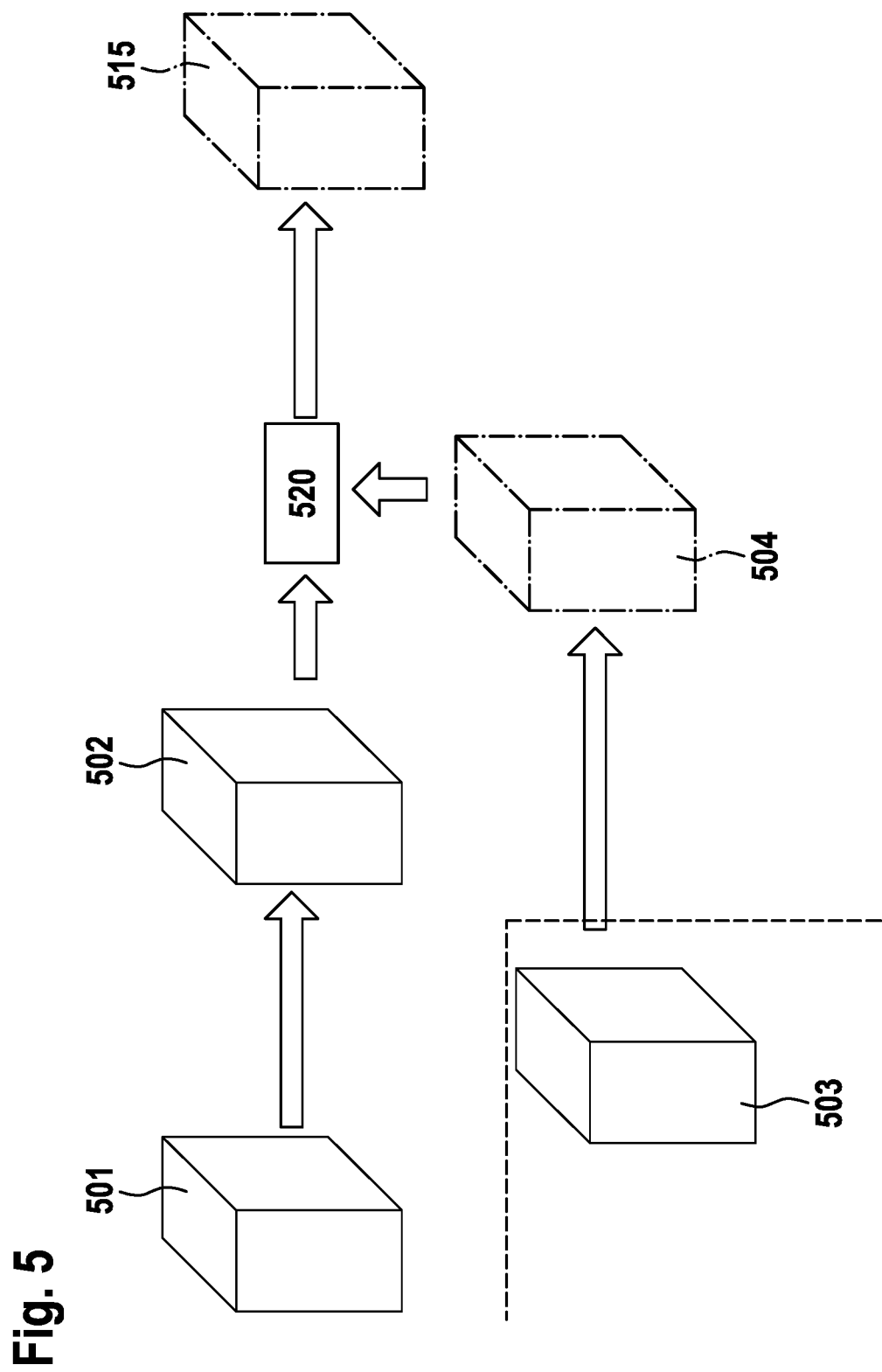
FIG. 5 shows an illustration of the connection function in the decoder block of an artificial neural network according to the FCN architecture.

FIG. 5 shows an illustration of the connection function in the decoder block of an artificial neural network according to the FCN architecture.

Encoder tensors 501 are formed in the encoder block of the network with the aid of the application of functions of an artificial neural network.

Encoder tensors 501 may be provided as skip tensors 502 directly to the decoder block via skip modules without a further processing in the encoder block and, if necessary, in the decoder block being necessary.

A result tensor is provided as decoder tensor 503 from a deeper layer of the decoder block or at the beginning of the decoder block from the deepest layer of the encoder block. Decoder tensor 503 is initially converted up (upsampling) to an upsampling tensor 504 when entering the next highest layer. Upsampling tensor 504 and skip tensor 502 are connected (merge) to one another with the aid of a connection function 520 and thus form result tensor 515 of the depicted layer.

Figure 6:
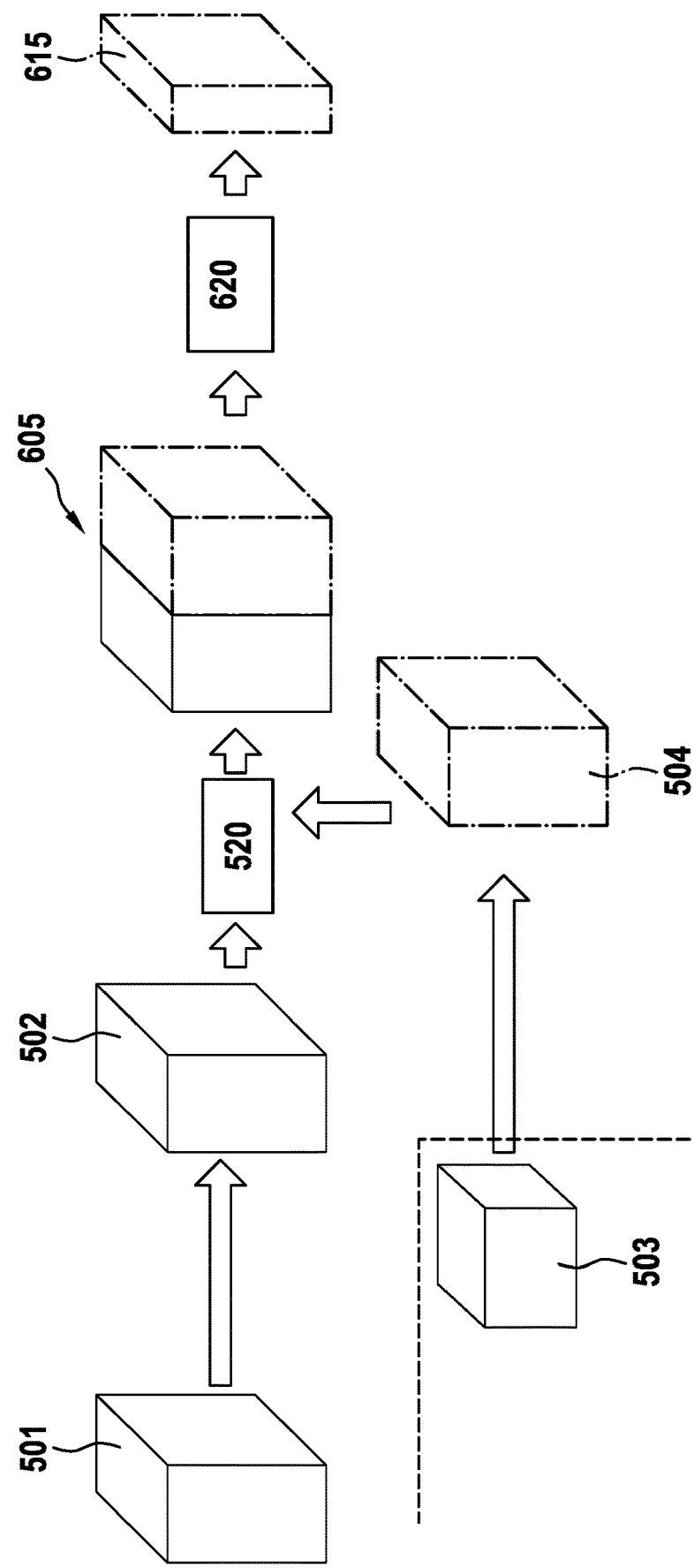
FIG. 6 shows an illustration of the connection function in an artificial neural network according to the U-net architecture.

FIG. 6 shows an illustration of the connection function (merge) in an artificial neural network according to the U-net architecture.

As in the previous illustration, an up-converted decoder tensor 502 is connected (merge) as upsampling tensor 504 to a connection tensor 605 by a skip tensor 502 with the aid of a connection function 520. In the illustration, the concatenation is applied as connection function 520. Other connection functions such as, for example, addition, multiplication and the like would also be conceivable.

A convolution function 620 (convolution) of an artificial neural network is subsequently applied to connection tensor 605 in order to form a result tensor 615 of the depicted layer.

The coarse and fine semantic features are connected to one another with the aid of convolution function 620 (convolution) with no direct relation to a target output class.

Figure 7:
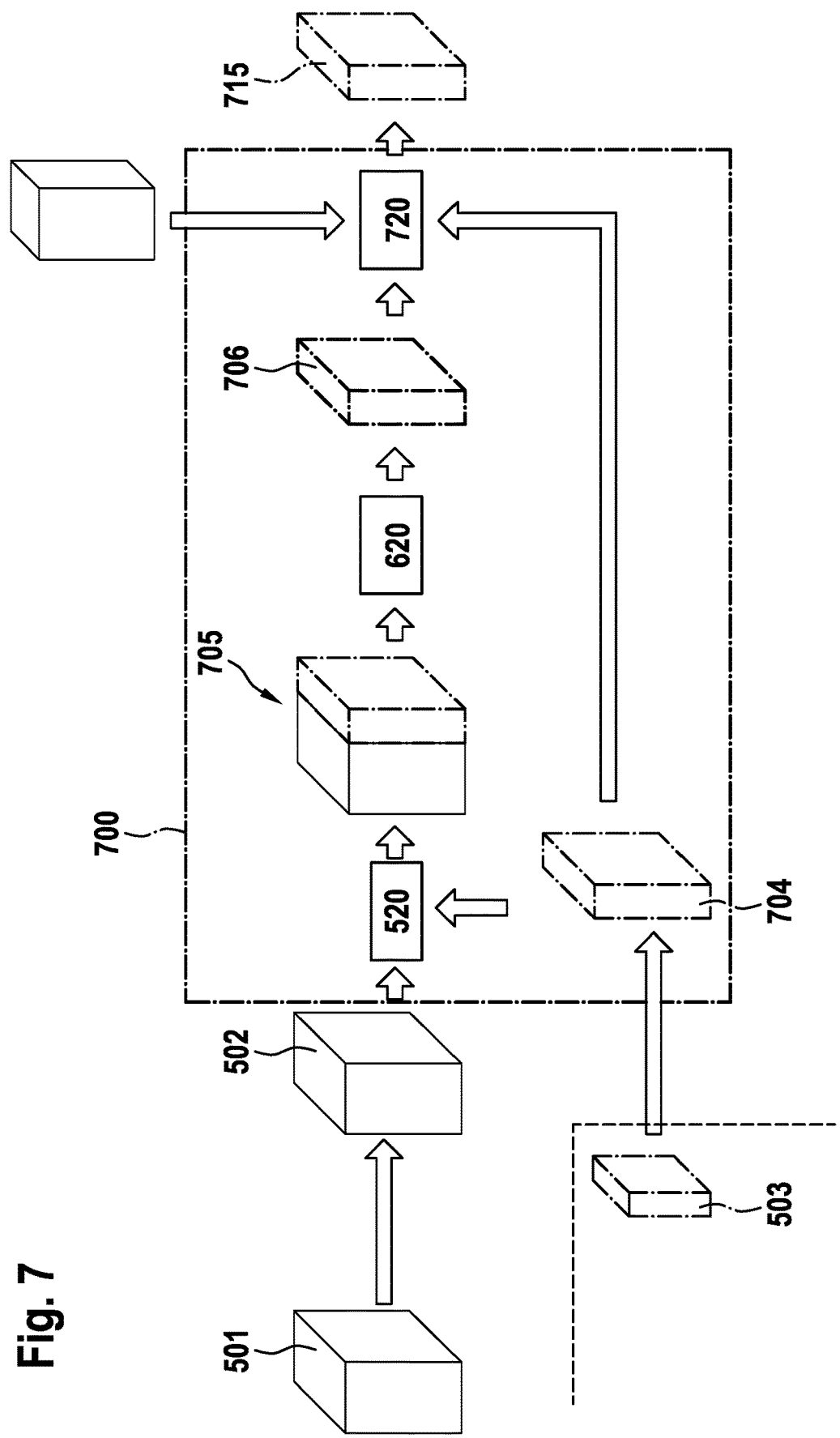
FIG. 7 shows an illustration of the connection function in an artificial neural network according to the U-net architecture according to the present invention.

FIG. 7 shows an illustration of the connection function in an artificial neural network according to the U-net architecture expanded by the present invention.

As in the previous illustrations, an up-converted decoder tensor 503 is connected (merge) as upsampling tensor 704 to a connection tensor 705 by a skip tensor 502 with the aid of an initial connection function 520.

A series of functions 620 of an artificial neural network are applied to connection tensor 705 in order to obtain a proof reader tensor 706. Applied functions 620 of an artificial neural network are intended to connect the coarse and fine features to one another, which are represented by the respective tensors, and are intended to appropriately fit the feature maps of the lower layers. Convolution, for example, —also in the form of a convolutional block—i.e., of multiple applications of convolutions, depth-wise convolution, squeeze, residual value (residual), density (dense), inception, activation (activation, act), normalization, pooling or the like.

Proof reader tensor 706 is subsequently connected (merge) to upsampling tensor 704 with the aid of a second connection function 720 in order to form a result tensor 715 of the depicted layer.

With the renewed connection (merge) 720 of proof reader tensor 706 to upsampling tensor 704 with the aid of a connection function 720, it is possible to correct the localization of a feature at a particular level. In this way, the localization of the features detected in the image data may be improved in that it becomes more exact.

With the aid of connection function (merge) 720, it is possible to connect not only proof reader tensor 706 to up-converted decoder tensor 704. It is conceivable that additional tensors 707 are also connected to result tensor 715 with the aid of connection function (merge) 720.

Figure 8:
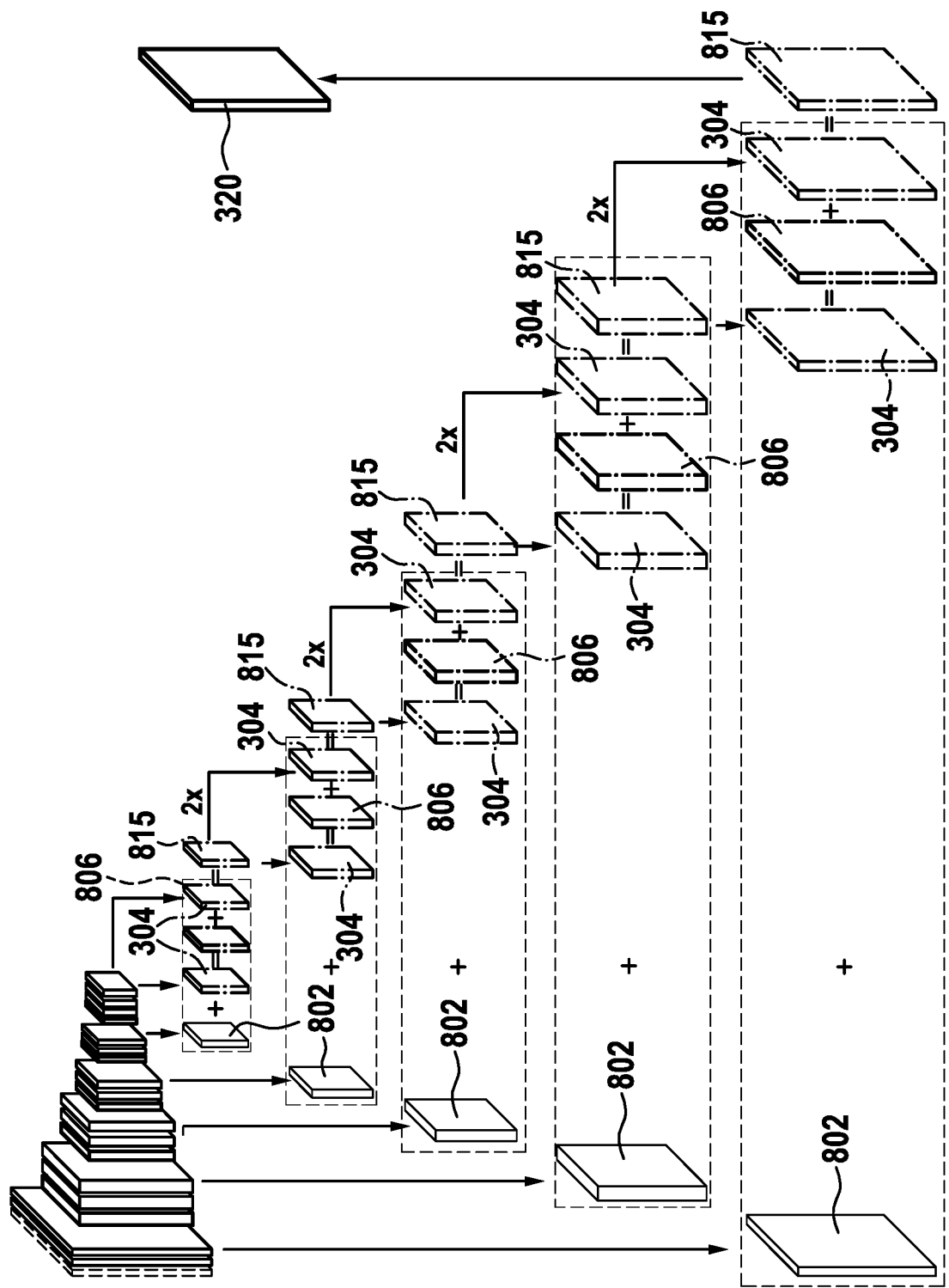
FIG. 8 shows an illustration of the application of the present invention in an artificial neural network according to the FCN architecture.

The application of the various functions to upsampling tensor 704, to connection tensor 705 and to proof reader tensor 706 forms a so-called correction module (proof reader module) 700. FIG. 8 shows an illustration of the application of the present invention in an artificial neural network according to the FCN architecture.

Here, the application of the present invention effectuates a reinforcement of the knowledge transfer among the layers, the effect of the "gradient vanishing", particularly on the discriminative layers, is being prevented.

The application of the present invention to an artificial neural network according to the FCN architecture may take place in that one skip tensor 802 each is connected (merge) in decoder module 120 to a proof reader tensor 806 by an upsampling tensor 304 with the aid of a connection function.

Proof reader tensor 806 is subsequently connected (merge) again to a decoder tensor 815 by upsampling tensor 304 with the aid of a connection function.

The result of the last layer of decoder module 120 of the artificial neural network according to the FCN architecture is a result tensor 320 having an optimized semantic segmentation and a resolution up to the original resolution of the processed imaged data.

Figure 9:
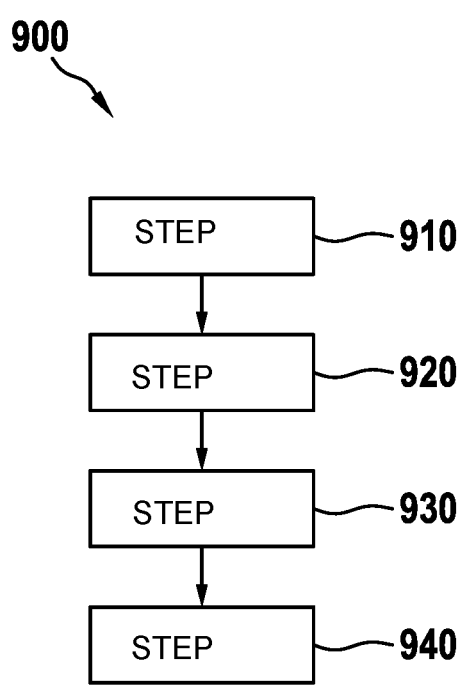
FIG. 9 shows a flow chart of one specific embodiment of the method 900 of the present invention.

FIG. 9 shows a flow chart of one specific embodiment of method 900 of the present invention.

An initial connection (merge) of an input tensor 304, 504, 704 to a skip tensor 502, 802 takes place in step 910 with the aid of a first connection function in order to obtain a merged tensor 605, 705, input tensor 304, 504, 704 and skip tensor 502, 802 being a function of image data 111, 211.

An application of a function of a neural network, in particular, of a convolution, to merged tensor 605, 705 takes place in step 920 in order to obtain a proof reader tensor 706, 806.

A second connection (merge) of proof reader tensor 706, 806 to input tensor 304, 504, 704 takes place in step 930 with the aid of a second connection function in order to obtain an output tensor 715, 815.

An output of output tensor 715, 815 to decoder path 120, 220 of the artificial neural network takes place in step 940.

The present invention is suited for use in an automotive system, in particular, in conjunction with driver assistance systems to and including semi-automated or fully automated driving.

Of particular interest in this case is the processing of image data or image streams, which represent the surroundings of a vehicle.

Such image data or image streams may be detected by imaging sensors of a vehicle. The detection in this case may take place with the aid of a single sensor. The merging of image data of multiple sensors, if necessary, of multiple sensors, with different detection sensors such as, for example, video sensors, radar sensors, ultrasonic sensors, LIDAR sensors, is also conceivable.

In this case, the ascertainment of free spaces (free space detection) and of the semantic distinction of foreground and background in the image data or image streams takes on particular importance.

These features may be ascertained by processing image data or image streams by the application of an artificial neural network according to the present invention. Based on this information, it is possible to activate the control system for the vehicle longitudinal control or lateral control accordingly, so that the vehicle responds appropriately to the detection of these features in the image data.

Another field of application of the present invention may be viewed as carrying out an accurate pre-labeling of image data or image data streams for a camera-based vehicle control system.

In this case, the labels to be assigned represent object classes that are to be detected in image data or in image streams.

The invention is further useable in all fields, for example, automotive, robotics, health, monitoring, etc., which require an exact pixel-based object detection (pixel-wise prediction) with the aid of artificial neural networks. The following, for example, may be cited here: optical flow, depth from single image data, numbers, border detection, key cards, object detection, etc.

What is claimed is:

1. A method for providing calculation resource-saving semantic segmentation of image data of an imaging sensor with an artificial neural network, the method comprising:
   initially connecting an input tensor to a skip tensor with an initial connection function to obtain a merged tensor, the input tensor and the skip tensor being dependent on the image data, the artificial neural network including an encoder path and a decoder path;
   applying a function of a neural network to the merged tensor to obtain a proof reader tensor;
   providing a second connection of the proof reader tensor to the input tensor with a second connection function to obtain an output tensor; and
   outputting the output tensor to the decoder path of the artificial neural network.

2. The method of claim 1, wherein the input tensor includes a feature map, and wherein in the applying, the function of the neural network is a function of the feature map.

3. The method of claim 1, wherein the initial connection function and/or the second connection function is configured so that a dimension of the input tensor is maintained.

4. The method of claim 1, wherein the method takes place in the decoder path of the artificial neural network.

5. A network for semantically segmenting image data of an imaging sensor, comprising:
   an artificial neural network, including an encoder path for classifying the image data and a decoder path for localizing the image data, and being configured to perform the following:
      initially connecting an input tensor to a skip tensor with an initial connection function to obtain a merged tensor, the input tensor and the skip tensor being dependent on the image data, the artificial neural network including an encoder path and a decoder path;
      applying a function of a neural network to the merged tensor to obtain a proof reader tensor;
      providing a second connection of the proof reader tensor to the input tensor with a second connection function to obtain an output tensor; and
      outputting the output tensor to the decoder path of the artificial neural network.

6. A device for semantically segmenting image data of an imaging sensor, comprising:
   an artificial neural network, including an encoder path for classifying the image data and a decoder path for localizing the image data, and being configured to perform the following:
      initially connecting an input tensor to a skip tensor with an initial connection function to obtain a merged tensor, the input tensor and the skip tensor being dependent on the image data, the artificial neural network including an encoder path and a decoder path;
      applying a function of a neural network to the merged tensor to obtain a proof reader tensor;
      providing a second connection of the proof reader tensor to the input tensor with a second connection function to obtain an output tensor; and
      outputting the output tensor to the decoder path of the artificial neural network.

7. A non-transitory computer readable medium having a computer program, which is executable by a processor, comprising:
   a program code arrangement having program code for providing calculation resource- saving semantic segmentation of image data of an imaging sensor with an artificial neural network, by performing the following:
      initially connecting an input tensor to a skip tensor with an initial connection function to obtain a merged tensor, the input tensor and the skip tensor being dependent on the image data, the artificial neural network including an encoder path and a decoder path;
      applying a function of a neural network to the merged tensor to obtain a proof reader tensor;
      providing a second connection of the proof reader tensor to the input tensor with a second connection function to obtain an output tensor; and
      outputting the output tensor to the decoder path of the artificial neural network.

8. The computer readable medium of claim 7, wherein the input tensor includes a feature map, and wherein in the applying, the function of the neural network is a function of the feature map.

9. The computer readable medium of claim 7, wherein the artificial neural network includes a convolutional neural network.

10. The method of claim 1, wherein the artificial neural network includes a convolutional neural network.

11. The network of claim 5, wherein the artificial neural network includes a convolutional neural network.

12. The device of claim 6, wherein the artificial neural network includes a convolutional neural network.

* * * * *